July 14, 1925.
W. T. TRUAX
DAMPER SPINDLE
Filed Aug. 30, 1922
1,545,802
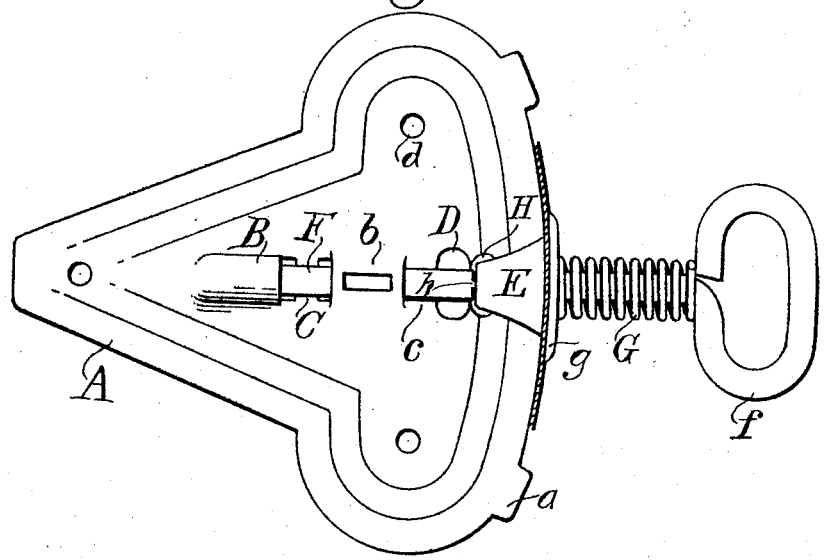
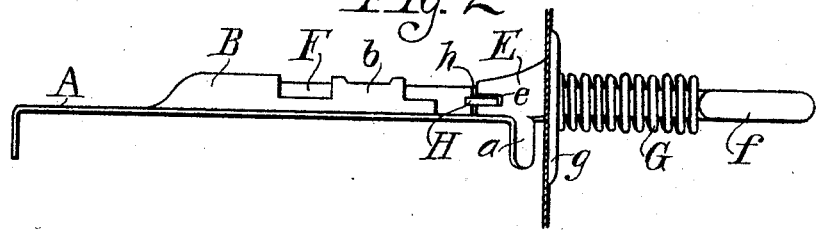
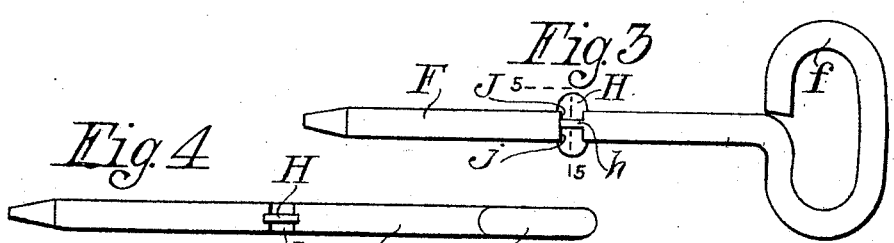
Inventor
William T. Truax,
By Edwin Guthrie,
Attorney Patented July 14, 1925.

1,545,802

UNITED STATES PATENT OFFICE.

WILLIAM THOS TRUAX, OF BATTLE CREEK, MICHIGAN, ASSIGNOR TO UNITED STATES REGISTER COMPANY, OF BATTLE CREEK, MICHIGAN.

DAMPER SPINDLE.

Application filed August 30, 1922. Serial No. 585,163.

*To all whom it may concern:*

Be it known that I, WILLIAM T. TRUAX, citizen of the United States, residing at Battle Creek, in the county of Calhoun and State of Michigan, have invented certain new and useful Improvements in Damper Spindles, of which the following is a specification.

This invention relates to damper spindles for damper clips or dampers such as are arranged in the warm air pipes of heaters and stoves generally, to control the warm air. It belongs more particularly in that class of damper constructions which are provided with a removable spindle, in order that the damper plate may be located in the air pipe and the spindle passed from the outside through a suitable opening into engagement with the damper, which is thereby held in its location and may be turned by turning the spindle. The spindles are usually provided with a handle on the ends outside of the pipe containing the damper. The object of this invention is the production of a spindle having parts of special construction whereby it is believed the manufacture of the same is materially expedited and cheapened.

In the accompanying drawings the special construction of this invention is illustrated, and Fig. 1 of the drawings represents a plan view of a damper clip having this invention applied thereto. Fig. 2 is a side view of the parts set out in Fig. 1. Fig. 3 is a plan view of the damper spindle alone. Fig. 4 is a side view of the damper spindle alone. Fig. 5 is a cross section on the broken line 5—5 of Fig. 3.

Throughout the drawings and description the same letter is used to refer to the same part.

Considering the drawing, the damper clip A has the usual tangs *a* by which it may be attached to a damper plate. The plate has the raised hollow portions B and *b*, and the depressed portions C and *c* adjacent to the raised portions. At the edge, as shown in Figs. 1 and 2 the clip A has the bell-shaped raised portion E, provided with a slot *e* located in the smaller open end of the portion E, for engagement with the keeper lugs of the spindle as hereinafter explained.

The damper spindle F has a handle *f* by which it may be turned, and encircling the spindle between the handle and the presser plate *g* is a coil spring G. It will be understood that the handle of the spindle, with the spring and the presser plate *g* are located outside of the stovepipe in the customary manner.

The damper clip A is provided next to the bell-shaped raised portion E, with an opening D, which will be again referred to, and the clip A has also usually the rivet holes *d*, as shown in Fig. 1.

As best illustrated in Figs. 3 and 4, the spindle F has on either side projecting lugs such as the lugs H, formed by stamping action from the body of the spindle, and there will be noted at right angles to the lugs or wings, the stiffening remainder portions *h* left by the stamping operation. The construction leaves the recesses such as J and *j* at the sides of the lugs and at the sides of the stiffening portions *h*.

This invention is operated in the customary manner. That is to say, the clip being attached to a damper plate, and located inside a stovepipe or the like, the damper spindle F is passed through a suitable hole in the pipe, the spring G being incidentally compressed, until the lugs H lie directly over the opening D in the clip or damper. When the spindle F is introduced into the stovepipe the lugs H are vertical, and the opening D permits the spindle to be turned until the lugs are disposed flatwise as illustrated in Figs. 1 and 2. The reaction of the spring G, now draws the lugs H into the slot *e* of the bell-shaped raised portion E described as formed at the edge of the clip A. It is believed to be clear that the clip may now be turned by turning the handle *f*, and by again compressing the spring G, and turning the lugs H vertically after they have cleared the slot *e*, the spindle may be easily removed.

It will be observed in this special construction that the rod from which the lugs are stamped or pressed, is of the same diameter throughout. No special formation or stock is called for, with the result that the manufacture is much cheaper than in those forms of damper spindles with which this applicant is acquainted, and the stamping process is of the simplest character.

Having now described this invention, and explained the mode of its operation, what I claim is:—

1. As an article of manufacture, a damper spindle comprising a rod of metal having integral portions formed to produce flat lugs at the sides, the said rod having a flat remainder portion located midway between the ends of the lugs and extending perpendicularly to the said lugs.

2. As an article of manufacture, a damper spindle comprising a rod of metal having integral portions formed to produce flat lugs at the sides, the ends of the said lugs extending beyond the sides of the rod, and the said rod having flat remainder portions located midway between the ends of the lugs and extending perpendicularly to the lugs.

In testimony whereof I affix my signature.

WILLIAM THOS TRUAX.